(12) United States Patent
Surcouf et al.

(10) Patent No.: US 12,430,119 B2
(45) Date of Patent: Sep. 30, 2025

(54) METHOD AND SYSTEM FOR GENERATING DESIRED STATES FOR EDGE SITES

(71) Applicant: Cisco Technology, Inc., San Jose, CA (US)

(72) Inventors: Andre Jean Marie Surcouf, Saint Leu la Foret (FR); Trevor George Smith, Leatherhead (GB); Fabien Gérard Andrieux, Antony (FR)

(73) Assignee: CISCO TECHNOLOGY, INC., San Jose, CA (US)

( * ) Notice: Subject to any disclaimer, the term of this patent is extended or adjusted under 35 U.S.C. 154(b) by 245 days.

(21) Appl. No.: 18/366,029

(22) Filed: Aug. 7, 2023

(65) Prior Publication Data
US 2025/0053405 A1 Feb. 13, 2025

(51) Int. Cl.
G06F 8/65 (2018.01)

(52) U.S. Cl.
CPC ..................... G06F 8/65 (2013.01)

(58) Field of Classification Search
CPC ............... G06F 8/60; G06F 8/61; G06F 8/65
See application file for complete search history.

(56) References Cited

U.S. PATENT DOCUMENTS

| 11,283,638 | B1* | 3/2022 | Earl .................... H04L 12/1877 |
| 11,625,141 | B2* | 4/2023 | Azmoon ............. G06F 3/04817 715/765 |
| 2010/0257409 | A1 | 10/2010 | Aranwela et al. |
| 2017/0257432 | A1 | 9/2017 | Fu et al. |
| 2018/0309848 | A1 | 10/2018 | Lekkalapudi |
| 2020/0285788 | A1 | 9/2020 | Brebner |
| 2023/0037308 | A1* | 2/2023 | Qin ........................ H04L 41/16 |

FOREIGN PATENT DOCUMENTS

WO 03021384 A2 3/2003

* cited by examiner

Primary Examiner — Marina Lee
(74) Attorney, Agent, or Firm — Baker Botts L.L.P.

(57) ABSTRACT

A digital image representation may be created by a distributed platform system for a site based on each of the plurality of user-specific actions. The digital image representation may be created by determining a current state of the site from one or more application components of the site, computing a desired state for the site to reach from the current state at some point in time, and creating the digital image representation for the site using the computed desired state to be reached by the site at some point in time. The distributed platform system uses one or more digital models for creating the digital image representation for the site. The distributed platform system may be configured to update the site to reach the desired state based on the digital image representation of the site, at some point in time.

20 Claims, 6 Drawing Sheets

METHOD AND SYSTEM FOR GENERATING DESIRED STATES FOR EDGE SITES

TECHNICAL FIELD

The present disclosure relates generally to an inverted digital twin for managing edge computing systems and more particularly, to a distributed platform system and a method for generating digital representations of desired states for edge sites.

BACKGROUND

A digital twin is a technology that is commonly used to create a representation of the real world. For example, the digital twin is utilized to create a digital representation of one or more edge sites on which one or more users may be working. Currently, digital twins are used for predicting how a particular edge site or a real system will operate. The closer to the real system the digital twin is, the better the results in predicting the behavior of the edge site.

There may be some edge site systems, including clusters of various nodes on which a user does not have direct control. For example, a node in the cluster may be disconnected from the network connectivity, and thus the user may not know the state of the node at that particular time. To have an accurate representation of any edge site system or a real system in a natural phenomenon a digital twin must have information about the real system/edge site at all times under any condition. For example, digital twins may be used to represent some physical real system and that may require constantly in synch with the physical real system to receive information from the real system. When the synch is lost, it is difficult to determine the current state or update of the real system. Also, the existing systems use the digital twin to predict what the behavior of the real system would be. For example, consider a crankshaft as real system whose behavior may be studied and predicted under severe constraints, for example, in high operating temperature or high revolution per minute (RPM). During prediction, the prediction model may be stimulated as the real system would be, for example, the model may increase crankshaft RPM beyond what is reasonable. With the stimulated values and states of the real system, the digital twin is used to predict what the behavior of the real system would be according to extreme RPM criteria. Thus, existing system using the digital twin do not have any action performed on the real world but create only a representation. Thus, it is generally difficult to have an up-to-date, accurate representation of such edge site system or the real system and predicting how a particular edge site system will react under any particular stimuli or situation is also difficult. This is particularly true for eventually consistent systems where time plays a crucial role in global system behavior. In general. digital twins may not be applied to drive and control the edge system or the real system or real world.

As another example, the edge site system may not be connected at all times or all the nodes in various clusters may not be connected. In such situations, the user may not perform any action or be enabled to monitor those particular nodes remotely since their current state may not be reflected in the digital twin. Existing approaches have limitations specifying that nodes, clusters of nodes, and edge site systems must be connected at all times to create an accurate digital twin representation which is difficult when the unconnected edge site systems do not report any information useful for the digital twin.

DETAILED DESCRIPTION

Overview

Figure 1:
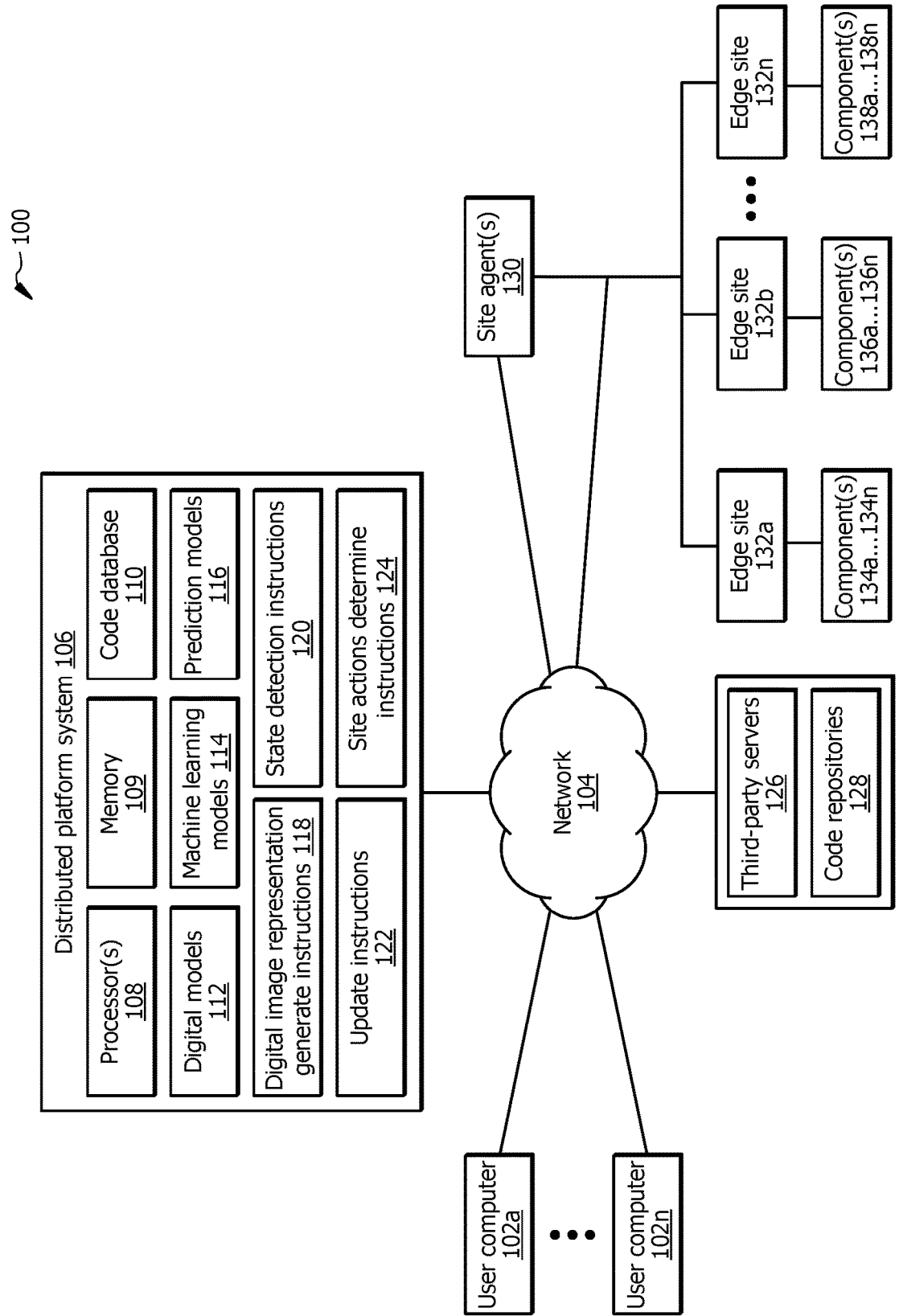
FIG. 1 illustrates a distributed network environment with a distributed platform system for determining digital image representations defining desired states to reach for multiple edge sites and application components, according to an embodiment.

Embodiments of the present disclosure relate to a method for generating desired states and digital image representations defining the desired states to a site. The method may be implemented by using a distributed platform system. The method includes receiving a plurality of user-specific actions from user computing devices to update the site. A digital image representation may be created by the distributed platform system for the site based on each of the plurality of user-specific actions. In an embodiment, the digital image representation may be created by performing one or more steps. The distributed platform system may determine a current state of the site based on one or more application components of the site. The distributed platform system may utilize one or more digital models for computing a desired state for the site to reach from the current state at a particular point in time or at some point in time eventually. In an embodiment, the desired state for the site may be mapped to each of the plurality of user-specific actions. The distributed platform system creates the digital image representation for the site using the computed desired state that needs to be reached by the site. In an embodiment, the desired state may be reached. The method includes updating step for updating the desired state to the site to reach based on the digital representation of the site.

Embodiments of the present disclosure relate to a system for generating desired states and digital representations defining the desired states to edge sites. The system may include a distributed platform system implementing or executing instructions for employing one or more digital models, one or more computing systems associated with one or more sites, including one or more clusters of application components, one or more site agents associated with the one or more computing systems of the one or more sites and where a site agent may be associated with a site, and a plurality of user computing devices defining user-specific actions. The system may further include one or more processors, memory units, and one or more computer-readable non-transitory storage media in communication with the one or more processors. The one or more non-transitory storage media include instructions that, when executed by the one or more processors, cause the system to perform one or more operations. The system may be configured to receive a plurality of user-specific actions from user computing devices to update a site. The system may be configured to create a digital image representation for the site based on each of the plurality of user-specific actions. The system creates the digital image representation by performing one or more steps. In an embodiment, the system determines a current state of the site from the application components of the site. A desired state may be computed for the site to reach from the current state at a particular/some point in time. The desired state may be computed by the system using one or more digital models. In an embodiment, the desired state for the site maps to each of the plurality of user-specific actions. Using the computed desired state that needs to be reached by the site at a particular/some point in time, the digital image representation may be created by the system. The system may be configured to update the site to reach the desired state based on the digital representation of the site.

Embodiments of the present disclosure relate to one or more computer-readable non-transitory storage media, including instructions that, when executed by one or more processors of a computer system comprising one or more digital models, are configured to cause the one or more processors to perform one or more operations. The processors may be configured to receive a plurality of user-specific actions from user computing devices to update a site. The processors may be configured to create a digital image representation for the site based on each of the plurality of user-specific actions. In an embodiment, the digital image representation may be created by performing one or more steps. The processors may be configured to determine a current state of the site from one or more application components of the site. The processors may be configured to compute a desired state for the site to reach from the current state at a particular/some point in time using the one or more digital models. In an embodiment, the desired state for the site maps to each of the plurality of user-specific actions. The processors may be configured to create the digital image representation for the site using the computed desired state to be reached by the site at the particular/some point in time. The processors may be configured to update the site agent for the site to reach the desired state based on the digital representation of the site.

The disclosure recognizes the existing challenges related to operating multiple edge sites and edge clusters of edge sites including multiple nodes. In general, the edge sites, edge clusters and nodes may be located in various places. Further, the edge sites, the edge clusters and nodes may not be connected or communicating with one another at all times due to limited or intermittent network access and network connectivity which makes their management and controlling operation super complicated and inefficient.

To solve the existing challenges, the embodiments of the present disclosure provide a computer-implemented technique to employ inverted or reversed digital twins for monitoring and managing multiple edge sites according to a desired state computation. For example, the technique of the present disclosure aims to create a digital image representation of an edge site that may be eventually translated into the real world with an accurate representation and description of what the reality may be at some point in the future. This technique turns the edge sites into a massive, eventually consistent distributed system. In exemplary embodiments, the techniques of the present disclosure may employ a plurality of Kubernetes clusters together with applications that one or more users may want to deploy on the clusters without needing the clusters to be pre-existing.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

There is a need to develop a method and a system for employing the digital twin technique in an inverted or a reversed way for managing operations of multiple edge sites in multiple locations efficiently by computing and setting a desired state for the edge sites to reach at some point in time. There is a need to create digital images of real systems not just restricted towards representing the real systems but also to drive and control the real world or real systems which may form inverted digital twin.

In general, edge sites may represent a physical location, a logical edge site, a subpart of an organization, or anything that can be defined by a user, for example, virtualizing the edge site, a part of an application implemented in the edge site, physical instantiation of the edge site, services performed for the edge site, or storage configuration and the like that could be practically operated/managed for the digital twin operations. One or more edge sites may be pre-configured with one or more nodes implementing application codes and/or services. In one example, the one or more nodes may be associated with storage configurations, memory allocations, or a database management controller that manages a database allocated for the one or more edge sites. In one example, the edge site(s) may not be pre-configured with any node. With each operation achieved or completed for the edge site(s), a state of the edge site(s) may be detectable, which also depends on the presence or absence of the node(s) in the edge site(s), including operations performed by the node(s).

To manage or control each edge site, embodiments of the present disclosure may rely on computing and/or predicting digital image representations that evaluate desired states or intents for the edge sites to reach at some point in time and a platform and a site agent associated with the edge site may achieve making intents real for the edge site. In an embodiment, the desired state may be a that applies at different levels starting from nodes, then to the edge sites. For example, application or service configurations may be considered as desired states need to be reached at the nodes and then on the edge site. Based on digital image representations with the desired states for the edge sites, the embodiments relate to defining a logical notion of the logical edge site/the physical edge site in which nodes may be deployed. For example, edge sites may be associated with predicted/computed digital image representations of the desired state and need to perform any of a list of actions to reach the desired state. For example, the list of actions may be related to deploying one or more application codes, physical instantiation of the edge sites, deploying storage services, reconfiguring the one or more nodes, modifying configurations of the nodes, adding a new node, splitting the edge site into one or more sub-sites, and replacing the one or more nodes, performing services, hosting applications and services, tagging the application codes and services for the edge site, storage configurations for the site, controlling the one or more nodes for the edge site, managing the one or more nodes for the site, configuring the one or more nodes for the site, maintaining the one or more nodes for the site, and any combination thereof. In an embodiment, the way the edge site may be updated with the desired state based on the digital representation may be driven by the edge site which actively polls a control plane to pull actions defined by the user-specific actions complying the desired states for the edge site to reach. In an embodiment, the desired state may be reached at a particular point in time and/or some point in time. The particular point in time and/or some point in time may be any time specified, set, and/or predicted in the future. The point in time may depend on external factors associated with the edge site, for example, network connectivity, network capacity, and configuration of the edge site including configuration settings of the nodes. In an embodiment, the edge site determines the desired state and the digital image representation computed and/or predicted by the digital platform (for example, control plane) based on which the edge site may converge toward the desired state. In an embodiment, the point in time may be specified or set or triggered based on user commands, or periodically or trigger from the site agent.

In some embodiments, the present disclosure may utilize the inverted digital twin technique for deploying multiple and various clusters of nodes, for example, Kubernetes clusters for the edge site(s). In one example, the Kubernetes clusters may be deployed with one-to-one mapping according to the operational, network capacity, available resources associated with the edge site, and intent capabilities associated with the edge sites operations. By achieving the list of actions and deployment of Kubernetes clusters for the edge site, the desired state may be achieved and completed for the edge site. In an embodiment, the desired state may be computed and/or predicted for individual nodes and the edge site may be created with the grouping of nodes forming an edge cluster. The user-specific action may command or expect a desired state to add two or more nodes to the edge site. In such scenario, each node may be deployed with different desired state, for example, a desired state for the leader node and a desired state for the worker node different from the desired state of the leader node. The combination of desired state reached by each node may achieve a working cluster that implements the desired state reached by the edge site. Similarly, in an embodiment, for application deployment or service deployment on the edge site, a new site level may be created and achieved/reached when the corresponding node(s) achieve their respective desired state.

The present disclosure provides a computer-implemented method, a distributed server (for example, a web server), and computer-readable storage media for generating desired states and updating the desired states to an edge site. One or more users may set a desired state for a site by specifying user-specific actions. The user-specific actions may be received from one or more user computing devices, for example, desktop computers, by the distributed server and the actions may be analyzed using trained machine-learning models. For each user-specific action, a new desired state may be computed based on the current state of the site/nodes of the site. Using the computed desired state, a digital image representation may be created for the site to be reached by the site at the some point in time. The desired state and the digital image representation may be updated to the site associated with a site agent. In an embodiment, the site agent may receive, determine or pull the desired state from the distributed server that may control/manage the site operations to reach the new desired state. Embodiments also relate to tracking/detecting states of the edge sites to determine whether the edge sites have reached the desired states computed or predicted for the edge sites. Based on the tracking/detecting of the updated states of the edge sites, the machine learning models may be trained and updated in real-time and dynamically.

One embodiment relates to a site agent associated with a site for receiving and/or determining the desired states from the distributed servers and distributing user-specific actions and the digital image representation with the desired states to the site. For example, the site agent may be a server or a control plane of a corporation that manages all the sites of various locations of the corporation. In some examples, the site agent may be a decision maker for actively pulling the desired states and distributing the desired states for the sites based on rules, policies, operational capacity, available resources for the edge site, network capacity, and intent capabilities associated with the operations of the site.

Embodiments relate to data repositories that may be associated with the distributed server and/or a third-party repository. The data repositories may be associated with storing application codes, services, storage configuration details, data on services to be performed on the nodes of the site, commands for controlling, managing, configuring, and maintaining operations of the nodes in the site, and any combination thereof. The site agent may be notified with any of the stored information in the data repositories to update/distribute the desired state to the site and the nodes of the site for reaching/achieving the desired state.

Embodiments relate to memory storage units and databases for storing pre-configuration information of each site and node, current states of each site and node, current updates of each site and node, desired states of each site and node, and digital image representations corresponding to each of each site and node, and user-specific actions specified via the user computing devices. The distributed server and storage media may rely on the stored information from the memory storage units to compute and/or predict the digital image representations and updated digital image representations along with a new desired state for notifying and updating the site agent to reach the new desired state. In some embodiments, the memory storage units and databases storing digital image representations with the most accurate computed desired state of the sites and nodes result in achieving a massive, eventually consistent distributed system. The control plane or the site agent associated with the site actively learns, pulls and determines the computed digital image representations and the desired state and distribute to the sites to reach the intended desired state. Also, this manner of computing the digital image representation and updating the most accurate desired state solves the problem of existing approaches that determine approximate representations of the physical reality as the digital twin.

Embodiments relate to one or more machine learning models and one or more digital models that may be utilized for computing the desired state and creating digital image representations for the sites to achieve. The present disclosure may apply or employ any of the one or more machine learning models and the one or more digital models for computing the desired state and creating the digital image representations for the sites. Any of the one or more machine learning models and the one or more digital models may be utilized for determining the current state of the site, network capacity of the site, resources available for the edge site, context, and intent-related operations of the site. The context and the intent-related operations may be associated with the kind of operations performed on the site and by the site. Based on the determination of the current state of the site, network capacity of the site, available resources, context, and intent-related operations of the site, any of the machine-learning models and the digital models may generate the desired state and the digital image representations for the site to achieve the desired state at some point in time. In some embodiments, the one or more machine learning models may be trained and updated in real-time using the desired state achieved by the site, where a new desired state may be determined for the site or for other sites similar to the site. In some embodiments, prediction models may be utilized along with the combination of any of the machine learning models, and/or the digital models may be utilized for predicting the current state and the desired state corresponding to the user-specific actions. Based on the predicted current and desired state, digital image representations may be created with the prediction to reflect the user-specific actions. In this way, the turnaround time for achieving the most consistent distributed system as the digital twin may be reduced.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present disclosure are in particular disclosed in the attached claims directed to a method, a storage medium, a system, and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates a distributed network environment 100 with a distributed platform system 106 for determining digital image representations defining desired states to reach for multiple edge sites and application components, according to an embodiment. FIG. 1 is shown in simplified, schematic format for purposes of illustrating a clear example, and other embodiments may include other elements. FIG. 1, the other drawing figures, and all of the descriptions and claims in this disclosure are intended to present, disclose, and claim a technical system and technical methods in which specially programmed computers, using a special-purpose distributed network environment design, execute functions that have not been available before to provide a practical application of computing technology to the problem of machine learning model development, validation, and deployment.

FIG. 1 illustrates the distributed network environment 100 with which one embodiment can be implemented and comprises components/elements that are implemented at least partially by hardware at one or more computing devices, such as one or more hardware processors executing stored program instructions stored in one or more memory units for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

In an embodiment, the distributed network environment 100 comprises elements, for example, user computers 102a-102n, distributed platform system 106, third-party servers 126, and site agents 130 communicatively coupled to a plurality of edge sites 132. The distributed network environment 100 comprises one or more data communication networks 104, enabling data exchange and communications between elements of the distributed network environment 100. The user computers 102a-102n, distributed platform system 106, third-party servers 126, site agents 130, and other elements of the distributed network environment 100 may host or include interfaces that are compatible with one or more networks 104 and are programmed or configured to use standardized protocols for communication across the networks such as application programming interface (API) calls, transmission control protocol (TCP)/internet protocol (IP), Bluetooth, and higher-layer protocols such as hypertext transfer protocol (HTTP), transport layer security (TLS), and the like.

In an embodiment, the distributed network environment 100 may be a multi-tenant environment. User computers 102a-102n, the third-party servers 126, and the site agents 130 are communicatively coupled, directly or indirectly, to the distributed platform system 106 via one or more data communication networks 104. Examples of the data communication network 104 include, without limitation, an ad hoc network, an intranet, an extranet, a virtual private network (VPN), a local area network (LAN), a wireless local area network (WLAN), a wide area network (WAN), a wireless wide area network (WWAN), a metropolitan area network (MAN), a portion of the Internet, a portion of the Public Switched Telephone Network (PSTN), near-field communication (NFC) network, a cellular technology-based network, a satellite communications technology-based network, Bluetooth, a cellular telephone network, or a combination of two or more of these networks. In an embodiment, the one or more data communication networks 104 may include any suitable links. For example, the links may include but are not limited to, one or more wireline (for example, Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET), satellite links or Synchronous Digital Hierarchy (SDH)) links. Links need not necessarily be the same throughout the environment 100. One or more links may differ in one or more aspects from one or more other links.

In an embodiment, FIG. 1 shows the data communication networks 104 that may be implemented by any medium or mechanism through which the user computers 102a-102n, the third-party servers 126, and the site agents 130 can interoperate and exchange data with one another. In some embodiments, edge sites 132a-132n can interoperate and exchange data with the distributed platform system 106 via the data communication network 104. The data communication networks 104 enable data exchange, including the user-specific actions, server actions on various application components 134*a*-134*n*, 136*a*-136*n*, 138*a*-138*n*, and states (current state and/or desired state) reached/achieved by each edge site 132*a*-132*n* based on the user-specific action at a particular/some point in time. The data communication networks 104 also enable the distributed platform system 106 and/or the site agents 130 to determine the current states and desired states of each edge site 132*a*-132*n* corresponding to user-specific actions and/or the server actions. In one embodiment, the data communication networks 104 may enable the distributed platform system 106 and/or the site agents 130 to determine and predict network connection accessibility with one or more application components 134*a*-134*n*, 136*a*-136*n*. 138*a* 138*n* in each of the edge sites 132*a*-132*n*, respectively, resources available for deploying the application codes, network capacity availability of each edge site 132*a*-132*n* and any sub-sites, and configuration settings related to pre-configuration of each edge site 132*a*-132*n*. In some embodiments, the data exchange and communication over the data communication networks 106 may be formatted in a variety of different ways including, for example, using hypertext markup language (HTML), cascading style sheet (CSS), JavaScript, extensible markup language (XML), or JavaScript object notation (JSON).

In an embodiment, the user computers 102*a*-102*n* in the environment 100 can comprise any kind of computing device such as a desktop computer, laptop computer, tablet computer, mobile computing device, smartphone, personal computers, personal digital assistants (PDAs), laptops, or workstations. For clarity, environment 100 may include n number of user computers 102*a*-102*n*. The designation n in reference characters means that in embodiments, the actual number of elements corresponding to a reference character has no specific limit other than the processing capability of related elements. Each of the user computers 102*a*-102*n* may be coupled to the distributed platform system 106. In some embodiments, the distributed network environment 100 can include thousands to millions of user computers 102 depending upon the processing capacity of central processing units (CPUs) or other hardware resources of the distributed platform system 106.

In an embodiment, the user computers 102*a*-102*n* may be associated with one or more users, customers, submitters, employees, requesters, code developers, code management units, code generate managers, reviewers, and other computer users who are involved in issuing or generating the user-specific actions for enabling the edge sites 132*a*-132*n* to reach at the desired state at the particular point in time. Throughout this disclosure, all references to "user" or "users" are specified for convenience but correspond to user computers that execute the technical steps described in the disclosure. Thus, even where the terms "user" or "users" appear, all steps and functions of the disclosure are intended as computer-implemented steps or technical steps and not manual, mental, human-performed, or abstract steps, each of which is hereby expressly excluded from the scope of the claims and the disclosure. The user-specific actions may be in any form of programming language that refers to a formalized text-based language that includes instructions for implementing functions and/or tasks using a computer. In some embodiments, the user-specific actions may be interpreted using a natural programming language (NPL) to determine the desired states for the edge sites 132.

In exemplary embodiments, the user-specific actions may include, but are not limited to, one or more of deploying application codes, reorganize deployment of application codes, generating codes, un-deploying application codes, redeployment of application codes, generating source codes, performing application services, hosting applications and services, tagging the application codes and services for the edge site 132, storage configurations for the edge site 132, controlling the one or more application components 134, 136, 138 for the edge site 132, managing the one or more application components 134, 136, 138 for the edge site 132, configuring the one or more application components 134, 136, 138 for the edge site 132, and maintaining states and operations of the one or more application components 134, 136, 138 for the edge site 132. Throughout this disclosure, a practical application may be implemented that may be related to updating a site agent 130 to update any of the edge sites 132*a*-132*n* to reach or achieve the desired state by implementing computer-generated and/or computer-updated digital image representations of the edge sites 132*a*-132*n*.

In an embodiment, the environment 100 may include third-party servers 126 and each third-party server 126 may be associated with code repositories 128. The third-party servers 126 may be a server farm, a cloud computing platform, a parallel computer, one or more virtual compute instances and/or virtual storage instances, and/or instances of a server-based application. In an embodiment, each of the one or more user computers 102 may execute application programs to access the third-party servers 126. The application programs can include a browser and other elements that can implement HTTP servers to interoperate with browsers. The browser can comprise any application program that is compatible with open protocols such as API, HTTP GET requests, HTTP and HTML protocols; commercially available examples include CHROME, SAFARI, EDGE, INTERNET EXPLORER, or FIREFOX.

In an embodiment, the user computers 102 may be associated with code repositories that may be similar or the same as the code repositories 128 of the third-party servers 126. The user computers 102 may be enabled to access the code repositories 128 of the third-party servers 126. The code repositories 128 may generally represent a data store, or database, one or more disks, tape drives, or solid-state drives, and may be used as an over-flow data storage device to store programs when such programs are selected for execution and to store instructions and data that are read during program execution related to accessing application codes, storage configuration settings, and application services that may be used by the distributed platform system 106 for computing digital image representation and desired states for the edge sites 132. The code repositories 128 may be volatile or non-volatile and may include read-only memory (ROM), random-access memory (RAM), ternary content-addressable memory (TCAM), dynamic random-access memory (DRAM), and static random-access memory (SRAM). The code repositories 128 may be configured to store application codes, instructions for managing operations and states of the edge sites 132, service codes related to providing instructions for performing services at the edge site 132 to reach the desired state, and data related to storage configurations of the application components 134, 136, 138 in the edge site 132 to update the digital image representations with the desired states for the edge sites 132.

In an embodiment, the distributed platform system 106 may be a web server including or comprising an HTTP server that can process user-specific actions, transmit responses including HTML payloads with dynamically generated web pages, and can include a firewall, load balancer, or other infrastructure to manage a large number of user-specific actions from the user computers 102 associated with the creation of digital image representations and desired states for the edge sites 132.

In some embodiments, the distributed platform system 106 may execute in a multi-tenant, multi-instance architecture in which large numbers of user-specific actions of the user computers 102 are processed, using separate or shared data storage with security controls. Further, the distributed platform system 106 may comprise a set of executable program instructions or units of instructions such as executables, binaries, packages, functions, methods, or objects that are hosted on the distributed platform system 106 of public data centers, private data centers, or cloud computing facilities. The distributed platform system 106 may be programmed to execute a per-tenant basis update process relating to updating desired states and digital image representations for the edge sites 132. In an embodiment, the distributed platform system 106 may be any computing devices that may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic. ASICs, or FPGAs with custom programming to accomplish the described techniques. In particular embodiments, the distributed platform system 106 may be associated with one or more servers. Each server may be a unitary server or a distributed server spanning multiple computers or multiple data centers. Servers may be of various types, such as, for example, and without limitation, web servers, API servers, news servers, mail servers, message servers, advertising servers, file servers, application servers, exchange servers, database servers, proxy servers, and other servers suitable for performing functions or processes described herein, or any combination thereof. In particular embodiments, each server may include hardware, software, or embedded logic components or a combination of two or more such components for carrying out the appropriate functionalities needed to compute desired states for edge sites 132 and updating machine learning models, prediction models and digital models implemented by the platform system 106.

The distributed platform system 106 may be programmed as multiuser software-as-a-service (SaaS) applications that interoperate with user computers 102, the third-party servers 126, and the site agents 130 including the edge sites 132 and one or more application components 134, 136, 138, via browsers. A commercial example of the distributed platform system 106 may be a "Great Bear platform" of Cisco Systems, Inc., San Jose, California.

The distributed platform system 106 may include processor(s) 108, memory 109, a network interface (not shown) and a code database 110. The processor(s) 108 of the distributed platform system 106 may be any electronic circuitry including, but not limited to, state machines, one or more CPU chips, logic units, cores (e.g., a multi-core processor), field-programmable gate array (FPGAs), application specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 109 and the network interface.

The processor 108 may be configured to process data and may be implemented in hardware and/or software. For example, the processor 108 may be 8-bit, 16-bit, 32-bit, 64-bit or of any other suitable architecture. The processor 108 may include an arithmetic logic unit (ALU) for performing arithmetic and logic operations, processor registers that supply operands to the ALU and store the results of ALU operations, and a control unit that fetches instructions from memory 109 and executes them by directing the coordinated operations of the ALU, registers and other components.

The memory 109 of the distributed platform system 106 may be operable to store user-specific actions, application codes, storage configuration instructions, service instructions, code deployment instructions, un-deployment of code instructions, code redeployment instructions and any data, instructions, logic, rules, or code operable to execute the functions to determine and update the digital image representations and desired states for the edge sites 132. The memory 109 includes one or more disks, tape drives, or solid-state drives, and may be used as an over-flow data storage device to store programs when such programs are selected for execution and to store instructions and data that are read during program execution. The memory 109 may be volatile or non-volatile and may include ROM, RAM, TCAM, DRAM, and SRAM. The memory 109 may be configured to store information on each edge site 132 and application component 134, 136, 138, for example, identification, configuration settings, current states, network capacity information, and site agent 130 information.

The code database 110 may be configured to store the application codes, the applications services, storage configuration details/settings, reorganization configuration, for example, code deployment, un-deployment of codes, code redeployment data, services to be performed on the application components 134, 136, 138 (nodes) of the edge site 132, commands for controlling, managing, configuring, and maintaining operations of the application components 134, 136, 138 in the edge site 132, and any combination thereof. In some embodiments, the code database 110 may be configured to store pre-configuration information of each application component 134, 136, 138 of each edge site 132, current states of each application component 134, 136, 138 and each edge site 132, current updates related to updated machine learning models 116 computations for each application component 134, 136, 138 and each edge site 132, desired states of each application component 134, 136, 138 and each edge site 132, and digital image representations corresponding to each of each application component 134, 136, 138 and each edge site 132. In an embodiment, the code database 110 may be configured to store predicted digital image representations of each application component 134, 136, 138 and each edge site 132 and predicted desired state of each application component 134, 136, 138 and each edge site 132. The distributed server and storage media may rely on the stored information from the memory storage units to compute and/or predict the digital image representations and updated digital image representations along with a new desired state for notifying and updating the site agent to reach the new desired state. In some embodiments, the memory storage units and databases storing digital image representations with the most accurate computed desired state of the sites and nodes result in achieving a massive eventually consistent distributed system. Also, this manner of computing the digital image representation and updating the most accurate desired state solves the problem of existing approaches that determine approximate representations of the physical reality as the digital twin.

In some embodiments, the distributed platform system 106 comprises digital models 112, machine learning models 114 and prediction models 116. The digital models 112 and the machine learning models 114 may be utilized for computing the desired states and creating digital image representations for the edge sites 132. For example, any of the digital models 112 and the machine learning models, or the combination thereof may be utilized for determining the current state of the edge sites 132, resources available to perform code redeployment, un-deployment, organizing the code deployment at different application components, network capacity of the edge sites 132, and context and intent-related operations of the edge sites 132 and combination thereof. The context and the intent-related operations may be associated with the kind of operations performed on edge site 132 and by edge site 132. Based on the determination of the current state of the edge sites 132, network capacity of the edge sites 132, context, and intent-related operations of the edge sites 132, any of the digital models 112 and the machine-learning models 114 may generate the desired states and the digital image representations for the edge sites 132 to achieve the desired state at some point in time. In some embodiments, the machine learning models 114 may be trained and updated in real-time using the desired state achieved by the edge site 132 each time, where a new desired state may be determined for the edge site 132 or for other sites similar to the edge site 132. For example, when the new desired state corresponds to a new application deployment, the basic model adding the new application deployment to the digital image may result in error when the new desired state is pulled and executed by the edge site simply because there may not be enough resource to deploy this new application. Therefore, embodiments providing the machine learning techniques determines the current state and calculate that the new desired state that can be reached by the edge after some applications are reorganized (deployed differently). In some embodiments, the digital image representations may evolve based on the resources available for the edge site to perform the operations to reach the corresponding desired state. For example, For the new digital image may evolve toward a different edge model resulting in creating several new individual steps the edge site to go through such as un-deploy old applications A and B, deploy a new application C, redeploy applications A and B with new parameters corresponding to assigning them to a particular node. These individual steps achieve the new desired state for the edge site 132.

In some embodiments, the prediction model 116 may be utilized along with the combination of any of the machine learning models 114 and/or the digital models 112 for predicting the current states and the desired states corresponding to the user-specific actions. Based on the predicted current states, digital image representations with the desired states may be created to reflect the user-specific actions.

The distributed platform system 106 comprises computer-executable stored program instructions including, but not limited to, digital image representation generate instructions 118, state detection instructions 120, update instructions 122 and site actions determine instructions 124.

The digital image representation generate instructions 118 may be configured to detect, determine, and obtain a plurality of user-specific actions from the user computers 102 via a web link. Based on each user-specific action of the plurality of user-specific actions, the digital image representation generate instructions 118 may be configured to generate a digital image representation for an edge site 132. In some embodiments, one or more digital image representations may be determined for a single edge site 132 to reach the desired state at different points in time. In some embodiments, a single digital image representation may be generated at a time for each of the edge sites 132 and/or one or more subsets of edge sites 132. In an embodiment, the creation of digital image representations depends on the network capacity of the edge site 132 connecting to various application components 134, 136, 138.

The state detection instructions 120 may be configured to determine the current states of the edge site 132 based on the current states of the application components 134, 136, 138 of the edge sites 132. In an embodiment, the state detection instructions 120 may be configured to utilize the digital models to compute desired states for the application components 134, 136, 138 of the edge sites 132 (subsets of the edge sites 132) for reaching the desired states at a particular point in time based on the digital image representation of the edge site 132. In some embodiments, the state detection instructions 120 may be configured to determine or detect the state of each application component 134, 136, 138 that corresponds to preconfiguring stages defining predetermined storage configuration and predetermined activities or services.

The update instructions 122 may be configured to update the desired states and digital image representations for the edge sites 132 to the site agent 130 that may be coupled to the edge sites 132 and the application components 134, 136, 138. In an embodiment, the update instructions 122 may be configured to update the machine learning models 114 and the prediction models 116 and to train the models (114, 116) to improve/optimize the computation of the desired states and digital image representations. The application of the updated machine learning models 114 and the prediction models 116 may reduce the time for the edge sites 132 to reach the desired states.

The site actions determine update instructions 124, which may invoke one or more site actions when the site agent 130 is updated with the digital image representations with the desired states. For example, the site actions may include but are not limited to deploying one or more application codes, deploying storage services, reconfiguring the one or more application components 134, 136, 138, reorganizing configurations of the application components 134, 136, 138, modifying configurations of the application components 134, 136, 138, adding a new application component, redeploying application codes, un-deploying application codes, redefining the configuration of application components 134, 136, 138 based on resources available to the components 134, 136, 138 and resources available for the edge site 132, splitting the site into one or more sub-sites, and replacing the one or more application components 134, 136, 138. The site actions may be performed on the application components 134, 136, 138 of the edge sites 132 to reach the desired state at a particular point in time. In some embodiments, the site actions may be performed when the application components (134, 136, 138) connect to the network of the edge site 132, for example, when the application components come online with the network maintained in the edge site 132. In some embodiments, the site actions may be performed based on the network capacity and resources available for the edge site 132. In an embodiment, the site actions depend on network characteristics, network conditions, operating conditions, and environmental conditions of the edge sites 132.

The distributed platform system 106 may include presentation instructions configured to represent the states, current states of the application components 134, 136, 138 of the edge sites 132 and the desired states reached by the application components 134, 136, 138 of the edge sites 132. The presentation instructions may be configured to display the digital image representations on a display unit associated with the user computers 102. In some embodiments, the presentation instructions may be configured to display the digital image representations of edge sites 132 on display units associated with platform system 106. In some embodiments, the presentation instructions may be configured to invoke instructions for displaying the desired states and the digital image representations on display units/screens associated with edge sites 132 and the application components 134, 136, 138. In some embodiments, the presentation instructions may be configured to provide alerts about the desired states and the digital image representations for the application components 134, 136, 138 and the edge sites 132. The alerts may be provided to the user computers 102, the display units of the platform system 106 and the display units/screens associated with edge sites 132 and the application components 134, 136, 138.

In an embodiment, the site agent(s) 130 may be a server, application servers that may include a cloud computing platform that comprises processors and memory that stores instructions for generating/invoking the one or more server actions for the edge sites 132. In some embodiments, the site agent 130 may be an interface configured to learn and pull user-specific actions defining digital image representation and desired states from an API server (for example, Kubernetes API server) associated with an enterprise, industry, or manufacturer environment. The site agents 130 may be distributed geographically for the enterprise, franchise, or industry, for one or more edge sites 132. The site agents 130 may be configured to receive the desired states with the digital image representations for the edge sites 132 and update the memory with the received information. Based on the desired states and the digital image representations, the site agent 130 may invoke decision-making policies for distributing the desired states to each of the edge sites 132. For example, the site agent 130 may distribute the desired states based on operational capacity, available resources associated with the edge site, network capacity, and intent capabilities associated with the operations of the edge site 132. For example, the site agent(s) 130 may be a single combination of servers of a corporation that manages one or more of edge sites and/or all the edge sites of various locations.

In an embodiment, the edge sites 132 may represent a physical site, a logical edge site, logical notion, a subpart of an organization, an e-commerce site, or anything that can be defined by a user, for example, virtualizing the edge site, a part of an application implemented in the edge site, services performed for the edge site, or storage configuration and the like that may be practically operated/managed for the (inverted) digital twin operations in an inverted manner. In an embodiment, the edge sites 132 may be divided into one or more subsets of edge sites. In an embodiment, the platform system 106 and/or the site agent 130 pre-configures the one or more edge sites 132 with the one or more application components 134, 136, 138 (nodes) implementing application codes and/or services corresponding to reach the desired state based on the digital image representations. In one example, the edge site(s) 132 may not be pre-configured with any application component. Each edge site 132 may be associated with particular network capacity, network conditions and network connections. In an embodiment, the application components 134, 136, 138 may be software application, machines, systems, physical components, logical processes, modules, blocks, circuits, sub-systems, articles, and other elements that may be among the context of the digital twin environment in an inverted manner. In one example, the one or more application components 134, 136, 138 (nodes) may be clusters of Kubernetes edge components and any of the components may be a leader node in a Kubernetes edge site. Each of the application components 134, 136, 138 (nodes) may be associated with pre-configuration settings, for example, storage configurations, memory allocations, software processes, machine implementations, version of the application codes, and services on the components. The one or more application components 134, 136, 138 may be associated with updating their current states into the desired state based on the digital image representation. In an embodiment, the states (current, past, desired state achieved) at any point in time reveals or determines the states of the corresponding edge site 132. For example, the states of the edge sites correspond with the states of the application components. In one example, not all the application components 134, 136, 138 in a particular edge site 132 may be connected due to loss of network connection. In an embodiment, the application component, for example, 134a reaches the desired state when the application component 134a forms connectivity with the edge site 132a. In an embodiment, the application component 134a updates that it has reached the desired state at a particular time to the edge site 132a, which transmits the state information to the platform system 106 via the site agent 130. With each desired state, the operation achieved or completed for the edge site(s) 132, a state of the edge site(s) 132 may be detectable, which also depends on the presence or absence of the application components in the edge site(s) 132, including operations performed by the application components.

In an embodiment, each of the user computers 102, the distributed platform system 106, the site agents 130, the edge sites 132, and components 134, 136, 138 may comprise a network interface. The network interface may be configured to enable wired and/or wireless communications among all the elements of the environment 100. The network interface may be an electronic circuit that is configured to enable communications between devices. For example, the network interface may include one or more serial ports (e.g., USB ports or the like) and/or parallel ports (e.g., any type of multi-pin port) for facilitating this communication. As a further example, the network interface may include a WIFI interface, a LAN interface, a WAN interface, a modem, a switch, or a router. In an embodiment, the network interface may be configured to use any suitable type of communication protocol as would be appreciated by one of ordinary skill in the art.

Figure 2:
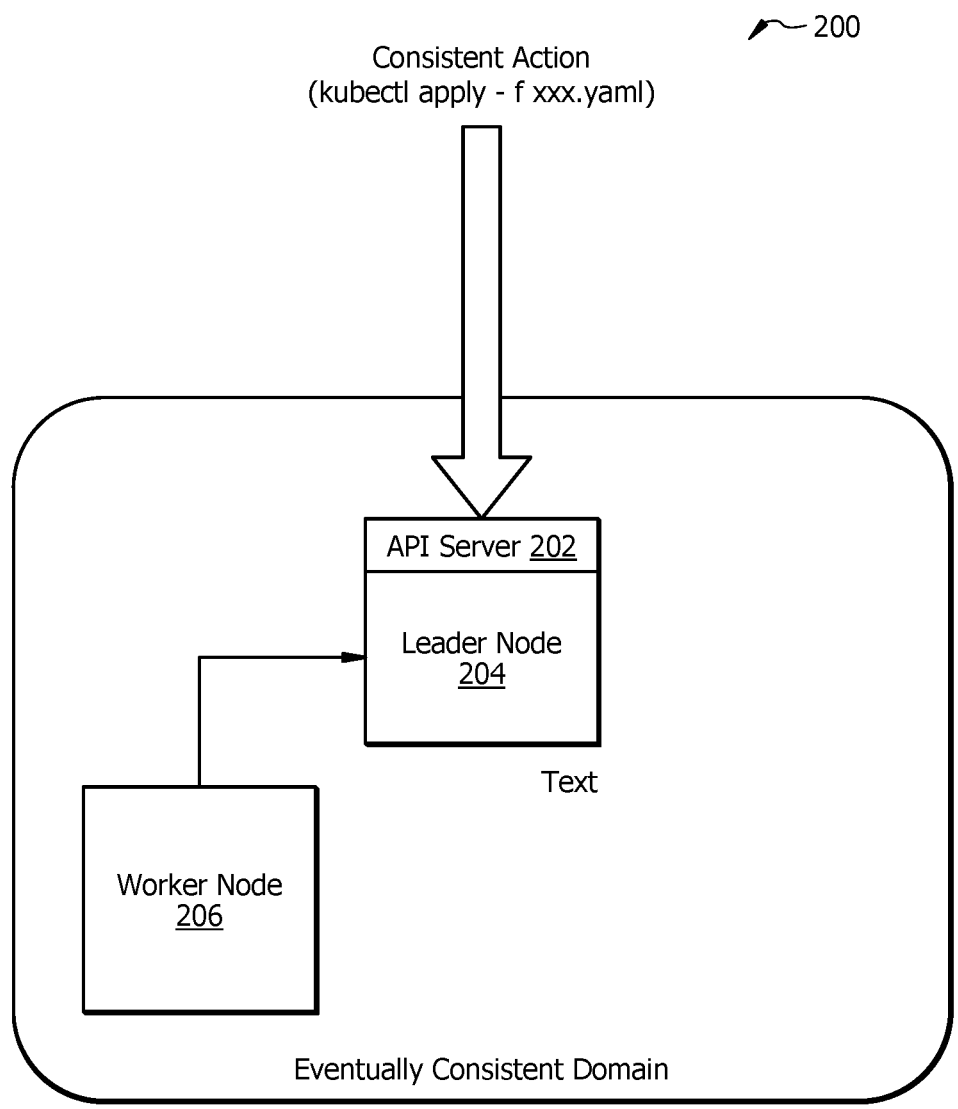
FIG. 2 illustrates an application programming interface (API) server for a particular edge site or domain, according to an embodiment.

FIG. 2 illustrates an exemplary API server 202 for a particular edge site or domain 200, according to an embodiment. FIG. 2 may be illustrated with reference to the Kubernetes domain environment 200. In the context of edge computing, Kubernetes may be, by nature eventually consistent, and the eventual consistency may be internal to Kubernetes. For example, once a Kubernetes cluster exists or is formed (this may be materialized by the existence of the leader node 204 of the said Kubernetes cluster) all subsequent actions may be eventually consistent even though the actions may be triggered by immediate actions that require direct access to the Kubernetes API server itself exposed by the leader node. According to FIG. 2, the explicit user action may eventually become consistent as soon as the user action may be evaluated in the Kubernetes API server, needing direct access to the API server. In an embodiment, the Kubernetes cluster may be created by the leader node 204 and each cluster creation may be consistent with the user-specific actions. In some scenarios, operating multiple edge clusters, which may be located in faraway places, possibly having limited or intermittent network access, makes their management more complicated and inefficient. Thus, the disclosed embodiments relate to utilizing a plurality of Kubernetes clusters together with all applications the user may want to deploy on them without the clusters currently being in existence. In an embodiment, the site agent(s) 130 may be configured for the cluster of application components 134, 136, 138 and the edge site 132 to learn, determine and pull the desired states actively from the distributed platform system 106. In an embodiment, the site agent(s) 130 may directly interact or communicate with the API servers, for example, Kubernetes API servers 202, and perform site actions on the edge site 132 to reach the new desired state for the edge site 132 to achieve the state eventually converging toward the computed or predicted digital image representations.

Figure 3:
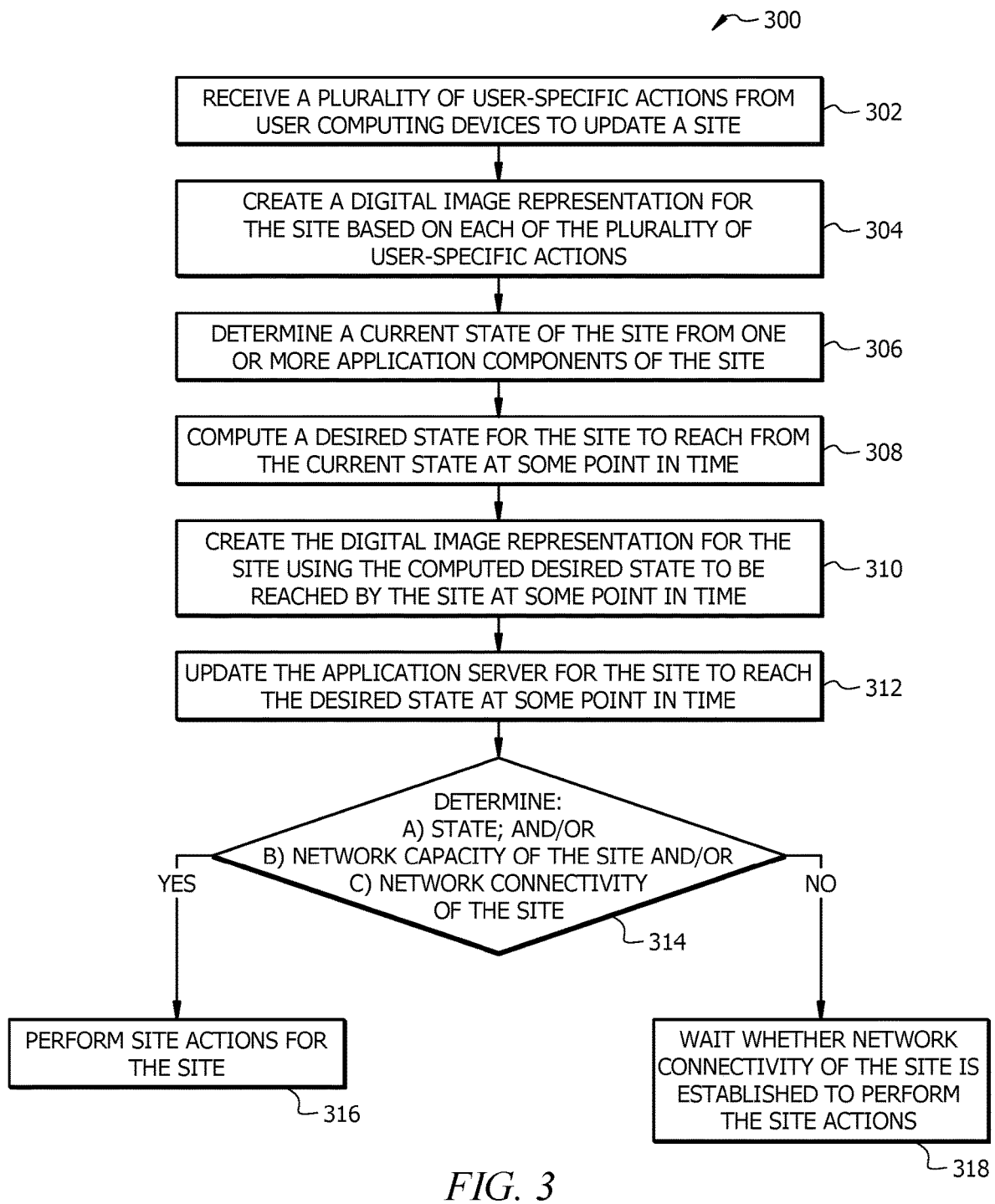
FIG. 3 depicts an example flowchart for generating or manipulating digital image representations defining desired states for multiple edge sites, according to an embodiment.

FIG. 3 depicts an example flowchart for generating desired states for multiple edge sites, according to an embodiment.

Process 300 uses the distributed platform system 106, which may be, for example, a web server that communicates with any kind of site agents 130, edge sites 132 and application components 134, 136, 138 (nodes).

Process 300 begins at step 302 and the distributed platform system 106 receives a plurality of user-specific actions from the user computers 102, for example, user computing devices. In an embodiment, the user-specific actions may be related to updating the site 132. In an embodiment, each site 132 may be pre-configured (referred to as pre-configuration settings) with the plurality of application components 134, 136, 138. For example, each application component 134, 136, 138 may be configured with predetermined storage and perform predetermined activities or services. In an embodiment, one or more user-specific actions may include, for example, one or more of deploying application codes, performing services, hosting applications and services, tagging the application codes and services for the site, storage configurations for the site, controlling the one or more application components 134, 136, 138 for the site 132, managing the one or more application components 134, 136, 138 for the site 132, configuring the one or more application components 134, 136, 138 for the site 132, and maintaining the one or more application components 134, 136, 138 for the site 132. In an embodiment, the pre-configured components (134, 136, 138) and the site 132 define a state which may be a recent state, current state, or in some scenarios, the desired state that has been reached according to the user-specific actions. For example, the state of each application component (134, 136, 138) may be detected based on the predetermined storage and predetermined activities or services and this state may define the state of the site 132.

At step 304, digital image representations representing a desired state for each site 132 may be created based on the one or more user-specific actions of the plurality of user-specific actions. In an embodiment, the creation of the digital image representations with the desired state for the site 132 depends on the network capacity, available resources, and pre-configuration settings of the site 132. In an embodiment, the creation of the digital image representations depends on the network capacity of the sub-sites of the site 132.

At step 306, the creation of the digital image representations with the desired state includes determining the current state of the site 132 (132*a*-132*n*) from states of the one or more application components 134, 136, 138, respectively.

At step 308, desired states for each site 132 may be computed from the current state by using the one or more digital models. The desired state maps to each of one or more user-specific actions of the plurality of user-specific actions.

At step 310, based on the desired state computed, the digital image representations for the site 132 may be created for site 132 to reach the desired state at a particular point in time or at some point in time in future.

At step 312, the distributed platform system 106 updates the edge site 132 with the digital image representations and the desired states for the site 132 to reach the desired state based on the digital image representation.

At step 314, the process includes determining the current state of each application component (134, 136, 138) of the site 132, the network capacity recognized for the site 132 at a current time or in real-time, available resources for the edge site to perform the site actions, the network connectivity of each application component (134, 136, 138), site 132 or the clusters of application components (134, 136, 138), and any combination thereof. For example, if the current state of each application component (134, 136, 138) of the site 132, the network capacity recognized for the site 132 at the current time or in real-time, the network connectivity of each application component (134, 136, 138), site 132 or the clusters of application components (134, 136, 138) and any combination thereof offer the likelihood the site 132 to implement one or more server actions, then at step 316, the one or more server actions may be performed on the site 132 to reach the desired state.

In instances where the current state of each application component (134, 136, 138) of the site 132, the network capacity recognized for the site 132 at the current time or in real-time, the network connectivity of each application component (134, 136, 138), site 132 or the clusters of application components (134, 136, 138), fewer resources available for the site 132 and any combination thereof do not offer the likelihood for the site 132 to implement one or more site actions, then the process determines the particular instance and waits for the connectivity of the one or more application components (134, 136, 138) including the site 132 with the network to perform the one or more site actions, as illustrated in step 318. In an embodiment, the one or more server actions may include one or more of deploying one or more application codes, deploying storage services, reorganizing the configuration of the application components, redeploying codes, un-deploying codes, splitting the codes, reconfiguring the one or more application components, modifying configurations of the application components, adding a new application component, splitting the site into one or more sub-sites, and replacing the one or more application components. In an embodiment, the process includes notifying the distributed platform system 106 with a notification from each site 132 and the one or more application components (134, 136, 138) indicating whether the desired state is reached when the one or more server actions are completed. For example, when the new desired state corresponds to a new application deployment, the basic model adding the new application deployment to the digital image may result in error when the new desired state is pulled and executed by the edge site simply because there may not be enough resource to deploy this new application. Therefore, embodiments providing the machine learning techniques determines the current state and calculate that the new desired state that can be reached by the edge after some applications are reorganized (deployed differently). In some embodiments, the digital image representations may evolve based on the resources available for the edge site to perform the operations to reach the corresponding desired state. For example, For the new digital image may evolve toward a different edge model resulting in creating several new individual steps the edge site to go through such as un-deploy old applications A and B, deploy a new application C, redeploy applications A and B with new parameters corresponding to assigning them to a particular node. These individual steps achieve the new desired state for the edge site 132.

In an embodiment, the process includes utilizing, training, and updating the machine learning models 114 and the prediction models 116. In some embodiments, the process utilizes the digital models 112 and the machine learning models 114 for computing the desired states and creating digital image representations for the sites 132. For example, any of the digital models 112 and the machine learning models, or the combination thereof, may be utilized for determining the current state of the edge sites 132, network capacity of the edge sites 132, and context and intent-related operations of the edge sites 132. The context and the intent-related operations may be associated with the kind of operations performed on edge sites 132 and by edge sites 132. Based on the determination of the current state of the edge sites 132, network capacity of the edge sites 132, context, and intent-related operations of the edge sites 132, any of the digital models 112 and the machine-learning models 114 may generate the desired states and the digital image representations for the edge sites 132 to achieve the desired state at some point in time. In some embodiments, the process includes training and updating the machine learning models 114 in real-time using the desired state achieved by the edge sites 132 each time, where a new desired state may be determined for the edge sites 132 or for other sites similar to the edge sites 132. In some embodiments, the process includes utilizing the prediction models 116 along with the combination of any of the machine learning models 114 and/or the digital models 112 for predicting the current states and the desired states corresponding to the user-specific actions. Based on the predicted current states, digital image representations with the desired states may be created with prediction to reflect the user-specific actions.

Although this disclosure describes and illustrates particular steps of process 300 of FIG. 3 as occurring in a particular order, this disclosure contemplates any suitable steps of process 300 of FIG. 3 occurring in any suitable order. Although this disclosure describes and illustrates an example process for generating desired states for multiple edge sites, including the particular steps of process 300 of FIG. 3, this disclosure contemplates any suitable method for generating desired states for multiple edge sites, including any suitable steps, which may include all, some, or none of the steps of process 300 of FIG. 3, where appropriate. Although FIG. 3 describes and illustrates particular components, devices, or systems carrying out particular actions, this disclosure contemplates any suitable combination of any suitable components, devices, or systems carrying out any suitable actions.

Figure 4:
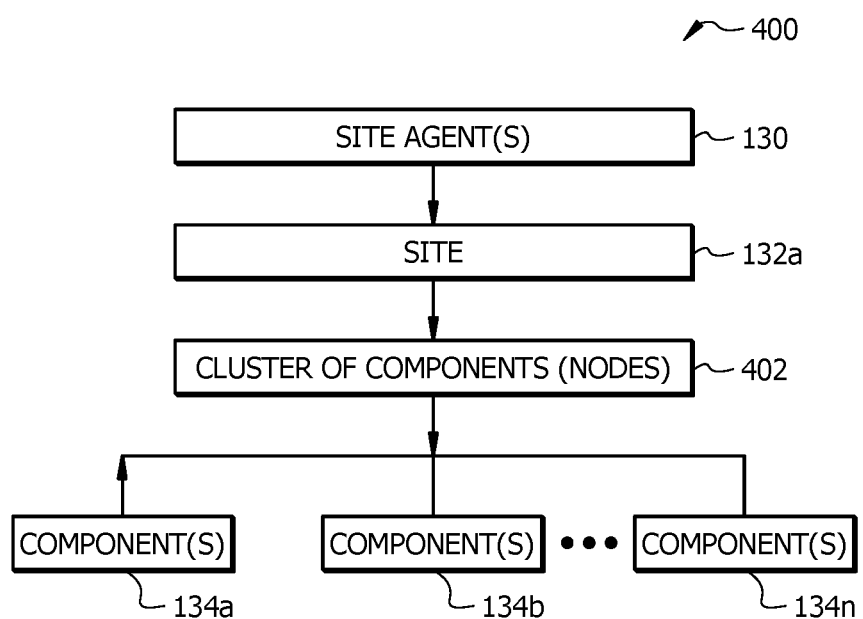
FIG. 4 illustrates an example of network topology of a site agent and an edge site including a cluster of nodes, according to an embodiment.

FIG. 4 illustrates an example of network topology 400 of the site agent 130 and an edge site 132a including a cluster of components (nodes) 402, according to an embodiment. The application components 134a, 134b, . . . , 134n may form a cluster 402 based on one or more factors. The factors include but are not limited to similar characteristics, similar updates needed to perform, similar device characteristics, and prioritized criteria associated with each component. In some embodiments, cluster 402 may be formed based on the real-time availability or establishment of network connectivity of the application component 134a, 134b, . . . , 134n.

Figure 5:
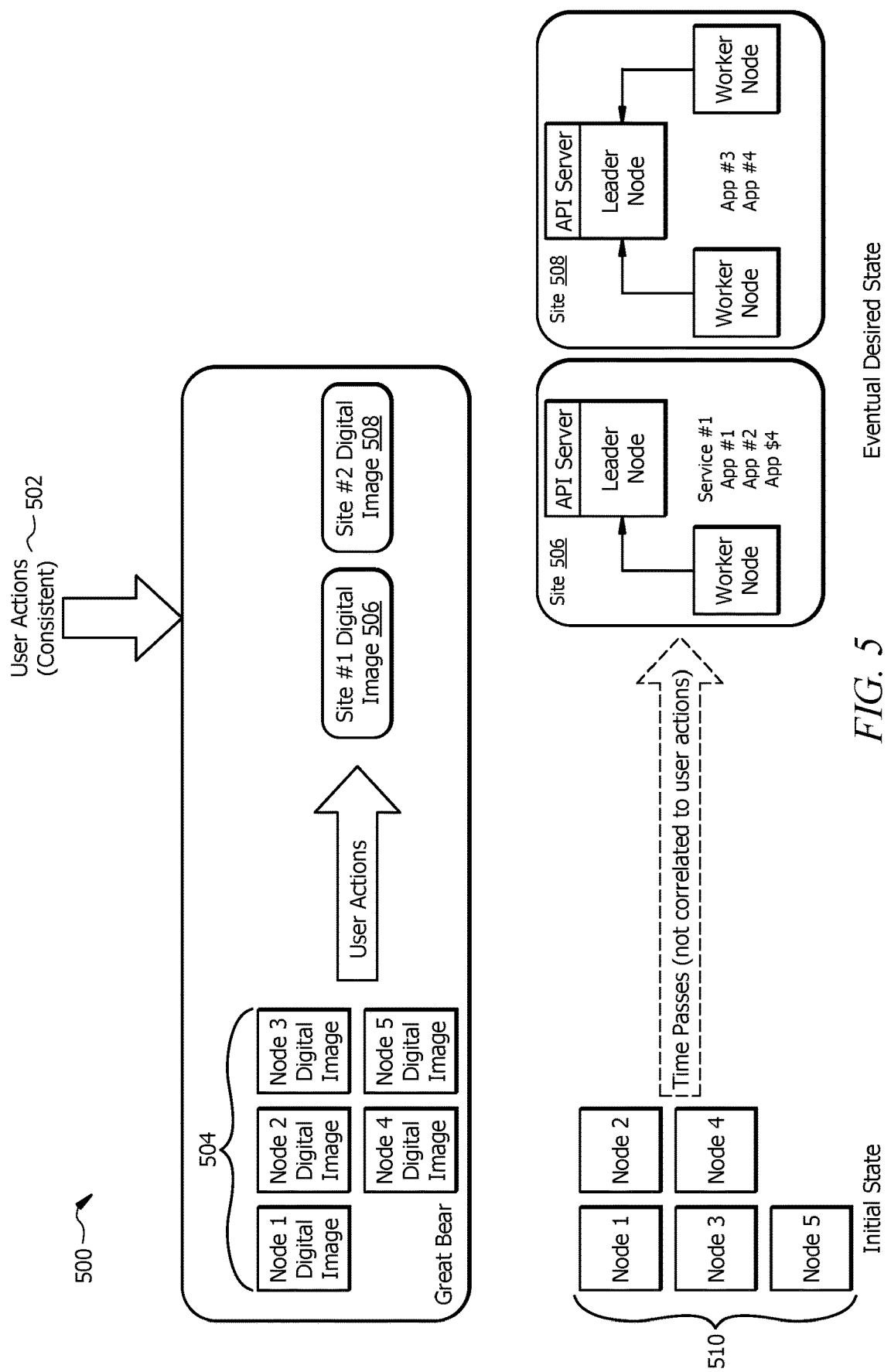
FIG. 5 illustrates an inverted or reversed digital twin representing desired states for various edge sites and application components, according to an embodiment.

FIG. 5 illustrates an inverted or reversed digital twin representing desired states for various edge sites 506, 508 and application components 504 and 510, according to an embodiment. FIG. 5 is illustrated with the notion of a logical site in which Kubernetes clusters may be deployed with one-to-one mapping with respect to the logical site 506/508 to which the clusters belong. In an embodiment, the user-specific actions that may be received from the user computers 102 are evaluated on the distributed platform system 106. The distributed platform system 106 internally maintains a set of digital images and each digital image represents the desired state for a given site 506/508. In an embodiment, the digital images may evolve over time, for example, when an application is deployed on the given site 506/508 or when each user-specific action affects the operation of the given site, including operations of the application components 504/510 (nodes). In an embodiment, the user-specific actions 502 may define application services with the deployment of application codes #1, #2, #4 for site #1 (506) and deployment of application codes #3, #4 for site #2 (508). The distributed platform system 106 evaluates digital images for each site 506, 508 which includes digital images for component node 504. After the evaluation of digital images for each site, 506/508, the API server for each cluster of nodes 510 may be updated with the digital images representing the desired state. For example, site 506 may be deployed with application codes #1, #2, #4 for site #1 (506) and application codes #3, #4 for site #2 (508).

In an embodiment, the user may be enabled to perform the actions such as configure nodes 1, 2, 3 in site #1, configure nodes 4, 5, 6, 7 in site #2, deploy storage service on site #1, add a new node to site #1, deploy a first application on site #2, deploy a second application on site #3, deploy a third application on site #1, deploy a second service both on sites #1 and #2. The user-specific actions 502 may define a list of actions that may create digital images that represent the real world with the elimination of any timing constraint for the real-world convergence toward the corresponding digital image. FIG. 5 shows digital images for sites 506 and 508 with an inverted (or reverse) digital twin with an accurate description of the reality at a particular point in time. This turns sites altogether into a massive, eventually consistent distributed system.

Figure 6:
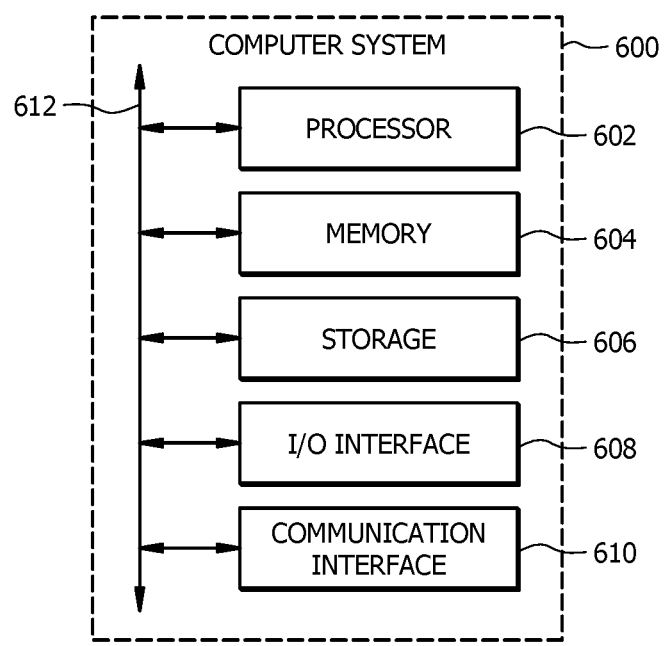
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide the functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 506 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memory 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
receiving, by a distributed platform system comprising one or more digital models, a plurality of user-specific actions from user computing devices to update a site;
creating, by the distributed platform system, a digital image representation for the site based on each of the plurality of user-specific actions, wherein the creating comprises:
  determining a current state of the site from one or more application components of the site;
  computing, by using the one or more digital models, a desired state for the site to reach from the current state, wherein the desired state for the site maps to each of the plurality of user-specific actions; and creating the digital image representation for the site using the computed desired state to be reached by the site; and updating, by the distributed platform system, the site to reach the desired state based on the digital image representation of the site.

2. The method of claim 1, wherein one or more user-specific actions of the plurality of user-specific actions comprises one or more of deploying application codes, performing services, hosting applications and services, physical instantiation of the site, tagging the application codes and services for the site, storage configurations for the site, controlling the one or more application components for the site, managing the one or more application components for the site, configuring the one or more application components for the site, and maintaining the one or more application components for the site.

3. The method of claim 1, further comprising causing a site agent to perform one or more actions for the site to reach the desired state, the one or more actions comprising one or more of deploying one or more application codes, physical instantiation of one or more sites, deploying storage services, reconfiguring the one or more application components, modifying configurations of the application components, adding a new application component, splitting the site into one or more sub-sites, reorganizing the adding, deletion and managing the applications of the application components according to resources available for the site, and replacing the one or more application components.

4. The method of claim 3, wherein the one or more actions are performed based on a network connection with the one or more application components in the site.

5. The method of claim 3, further comprising receiving, by the distributed platform system, a notification from the site and the one or more application components indicating whether the desired state is reached when the one or more actions are completed, wherein the desired state is reached at a particular point in time.

6. The method of claim 3, further comprising determining, by the distributed platform system, network capacity of the site and the sub-sites and resources available for the site or creating the digital image representation with the desired state for the site.

7. The method of claim 1, further comprising:
pre-configuring the site with a plurality of application components, wherein each application component is configured with predetermined storage and to perform predetermined activities or services;
detecting a state of each application component based on the predetermined storage and predetermined activities or services.

8. A system, comprising:
a distributed platform system comprising one or more digital models;
one or more sites comprising a cluster of application components;
one or more site agents associated with the one or more sites, wherein a site agent is associated with a site;
a plurality of user computing devices to define user-specific actions;
one or more processors; and
one or more computer-readable non-transitory storage media in communication with the one or more processors and comprising instructions, that when executed by the one or more processors, are configured to cause the system to:

receive a plurality of user-specific actions from user computing devices to update the site;
create a digital image representation for the site based on each of the plurality of user-specific actions, wherein the creation comprises:
determine a current state of the site from one or more application components of the site;
compute, by using the one or more digital models, a desired state for the site to reach from the current state, wherein the desired state for the site maps to each of the plurality of user-specific actions; and
create the digital image representation for the site using the computed desired state to be reached by the site; and
update the site to reach the desired state based on the digital image representation of the site.

9. The system of claim 8, wherein one or more user-specific actions of the plurality of user-specific actions comprises one or more of deploying application codes, performing services, hosting applications and services, physical instantiation of the site, tagging the application codes and services for the site, storage configurations for the site, controlling the one or more application components for the site, managing the one or more application components for the site, configuring the one or more application components for the site, and maintaining the one or more application components for the site.

10. The system of claim 8, wherein the instructions, when executed by the one or more processors, are further configured to cause the system to:
cause the site agent to perform one or more actions to reach the desired state, the one or more actions comprising one or more of deploying one or more application codes, deploying storage services, reconfiguring the one or more application components, modifying configurations of the application components, adding a new application component, splitting the site into one or more sub-sites, reorganizing the adding, deletion and managing the applications of the application components according to resources available for the site, and replacing the one or more application components.

11. The system of claim 10, wherein the one or more actions are performed based on a network connection with the one or more application components in the site.

12. The system of claim 10, wherein the instructions, when executed by the one or more processors, are further configured to cause the system to: receive, by the distributed platform system, a notification from the site and the one or more application components indicating whether the desired state is reached when the one or more actions are completed, wherein the desired state is reached at a particular point in time.

13. The system of claim 10, wherein the instructions, when executed by the one or more processors, are further configured to cause the system to: determine, by the distributed platform system, network capacity of the site and the sub-sites and resources available for the site for creating the digital image representation with the desired state for the site.

14. The system of claim 8, wherein the instructions, when executed by the one or more processors, are further configured to cause the system to:
pre-configure the site with a plurality of application components, wherein each application component is configured with predetermined storage and to perform predetermined activities or services;

detect a state of each application component based on the predetermined storage and predetermined activities or services.

15. One or more computer-readable non-transitory storage media including instructions that, when executed by one or more processors of a computer system, are configured to cause the one or more processors to:

receive, by a distributed platform system comprising one or more digital models, a plurality of user-specific actions from user computing devices to update a site;

create, by the distributed platform system, a digital image representation for the site based on each of the plurality of user-specific actions, wherein the creating comprises:

determine a current state of the site from one or more application components of the site;

compute, by using the one or more digital models, a desired state for the site to reach from the current state, wherein the desired state for the site maps to each of the plurality of user-specific actions; and create the digital image representation for the site using the computed desired state to be reached by the site; and update, by the distributed platform system, the site to reach the desired state based on the digital image representation of the site.

16. The media of claim 15, wherein one or more user-specific actions of the plurality of user-specific actions comprises one or more of deploying application codes, performing services, hosting applications and services, physical instantiation of the site, tagging the application codes and services for the site, storage configurations for the site, controlling the one or more application components for the site, managing the one or more application components for the site, configuring the one or more application components for the site, and maintaining the one or more application components for the site.

17. The media of claim 15, wherein the instructions, when executed by the one or more processors of the computer system, are further configured to:

cause a site agent to perform one or more actions to reach the desired state, the one or more actions comprising one or more of deploying one or more application codes, deploying storage services, physical instantiation of the site, reconfiguring the one or more application components, modifying configurations of the application components, adding a new application component, splitting the site into one or more sub-sites, reorganizing the adding, deletion and managing the applications of the application components according to resources available for the site, and replacing the one or more application components.

18. The media of claim 17, wherein the instructions, when executed by the one or more processors of the computer system, are further configured to: receive, by the distributed platform system, a notification from the site and the one or more application components indicating whether the desired state is reached when the one or more server actions are completed, wherein the desied state is reached at a particular point in time.

19. The media of claim 18, wherein the instructions, when executed by the one or more processors of the computer system, are further configured to: determine, by the distributed platform system, network capacity of the site and the sub-sites and resources available for the site for creating the digital representation with the desired state for the site.

20. The media of claim 15, wherein the instructions, when executed by the one or more processors of the computer system, are further configured to:

pre-configure the site with a plurality of application components, wherein each application component is configured with predetermined storage and to perform predetermined activities or services;

detect a state of each application component based on the predetermined storage and predetermined activities or services.

* * * * *